United States Patent Office 3,700,459
Patented Oct. 24, 1972

3,700,459
SHELLED CORN-COTTONSEED ANIMAL FEED
Ray Joe Riley, Hart, Tex., assignor to John Bridges, Earth, John Gilbreath, Hart, and Lewis Thurman, Earth, Tex., fractional part interest to each
No Drawing. Filed Mar. 13, 1970, Ser. No. 19,481
Int. Cl. A23k 1/00
U.S. Cl. 99—2 R                    12 Claims

ABSTRACT OF THE DISCLOSURE

A ration for fattening beef cattle contains only raw, whole, fuzzy cottonseed mixed with raw, whole shelled corn and mineral-vitamin supplements. To start the cattle upon fattening rations, corn silage is mixed with the rations.

BACKGROUND OF THE INVENTION

(1) Field of the invention

This invention relates to feeds, feeding and more particularly to feeding beef cattle for rapid gain and good conversion.

(2) Description of the prior art

Cottonseed has long been recognized as a valuable feed for dairy cattle or for maintaining breeding stock. See 21st Ed. Morrison, Feeds and Feeding, paragraph 786 at page 556. However, I am unaware of the use of raw, whole, fuzzy cottonseed fed with raw, whole shelled corn in the process of fattening cattle. Often the fattening ration includes cottonseed meal, (that portion left afer the cottonseed has been delinted, hulled and the oil extracted. For examples see Belasco, U.S. Patent 3,965,488 or Cavanaugh, U.S. Patent 2,934,431. One reason for not feeding raw, whole, fuzzy cottonseed might be the gossypol contained in the cottonseed, although gossypol probably presents no problem to ruminants, Johnson, U.S. Patent 3,084,046. Also, delinted cottonseed hulls have been used, Shiver, U.S. Patent 2,500,435.

Shelled corn is also recognized as a component of fattening rations, however, in recent times it has been thought desirable to crack and cook the corn before feeding.

SUMMARY OF THE INVENTION

(1) New and different function

I have found that mixing whole, raw, fuzzy or undelinted cottonseed with whole, raw, shelled corn produces a synergestic effect, which results in good conversion (about six to one) and good daily gains of about three pounds per day for a six hundred pound animal. Also, I have found that the two feeds mix well, handle well, and are eaten well by the cattle. However, more surprising is the synergistic effect of the two feeds together.

Benefits are gained from the ease of handling inasmuch as neither of the feeds need to be cooked, prepared, cracked, ground, but can be handled in their raw state, a state commercially available and is economically priced.

(2) Objects of this invention

The object of this invention is to fatten cattle.

Other objects are to achieve the above with a feed that is economical, stores well, mixes well, promotes good health, promotes rapid gains, is safe, versatile, easy to prepare and is easy to feed.

Still further objects are to fatten cattle with a method that is safe, rapid, versatile, efficient and inexpensive and does not require skilled people to mix and regulate.

The specific nature of the invention, as well as other objects, uses, and advantages thereof will clearly appear from the following description.

DESCRIPTION OF THE PREFERRED EMBODIMENT

In the practice of my invention, preferably the cattle are fed about ½ pound of whole, raw, fuzzy cottonseed for every one hundred pounds of body weight. In addition to this, as much whole, raw, shelled corn is mixed with the cottonseed as the animals will eat. The amount the cattle will eat is always determined from the previous day. I.e., if the cattle leave some feed at the end of the day, nor more or perhaps a little less corn is added to the ration. However, if the cattle clean up the feed before the end of the day, a little more whole, raw, shell corn is added to the ration. In addition to this, minerals, vitamins and medicated premixed supplements are added to the feed. Inasmuch as these premixed supplements, containing the various minerals such as calcium, phosphorous and other salts, vitamins and medication, such as antibiotics (e.g., aureomycin), are well known and readily available on the market, they will be hereinafter described as mineral-vitamin-medicated supplements; the amount fed is well determined and the standard practice of feeding is followed. Naturally, the different vitamins and minerals in the feed will vary in different parts of the country; therefore, it is difficult to prescribe for the entire United States just how much or what particular mixture is advisable. Using feed grown on the Northern High Plains of Texas, I have had good success using ½ lb. per animal per day of Farr "Custom" Mix, a product of Farr Better Feeds, of Hereford, Texas. Also, I have had good success using ½ lb. per animal per day of Morea® Liquid Feed, and a free choice of Catalyx® minerals, both products of Feed Service Corp., Crete, Nebr. I have found that ½ lb. per animal per day of Moorman's Premixtrate® medicated pellets, a product of Moorman Manufacturing Company, Quincy, Illinois, is satisfactory. Morea and Moorman's pellets contain urea, which is discussed hereinafter.

Therefore, it is understood that when the term "supplement," "premix," or "mineral-vitamin-medicated supplement," is used, it will be any one of the above, or any other standard supplement mix, in the proportions as would be standard for other feeding programs. When I use the term "cottonseed," reference will be to whole, raw, fuzzy cottonseed as is received from the gin. I.e., the cotton seed have not been processed in any way, not even delinted. Also, when I speak of "corn," I am speaking of raw, whole, shelled corn. My reference to "corn silage" means the standard product well known to cattle feeders of corn silage.

I have found that when the calves are first weaned and placed in the feed lot for fattening, often it is desirable to include corn silage in their rations. Therefore, a typical feed for a 400 pound calf just starting in the feed lot would be as follows:

Ration 1:                                              Lbs.
   Cottonseed _____ 2
   Silage _____ 8
   Whole, shelled corn _____ 2
   Mineral-vitamin-medicated supplement _____ ½

I have found that using a feed such as this, the calves will eat about 12 pounds per day and will obtain about a six-to-one conversion ratio, which would be about a two pound gain per day. One of the advantages of this feed is that animals maintain good appetites, good digestion, good conversion ratios, and good gains.

After the calves are started on this, the amount of silage is reduced and the amount of whole corn is increased. Within about 40 days after being placed in the feed lot, the silage will have been reduced to zero; the cattle will then be fed all corn and cottonseed and mineral-vitamin-medicated supplement.

A typical ration at that stage of growth for a 500 pound calf would be:

Ration 2: Lbs.
Cottonseed _____ 2½
Corn _____ 12½
Mineral-vitamin-medicated supplement _____ ½

Upon this ration, the calves will maintain their six-to-one conversion ratio and will gain about 2½ pounds per day upon such a ration.

At the time the calves reach a weight of 600 pounds, a typical ration would be:

Ration 3: Lbs.
Cottonseed _____ 3
Corn _____ 15
Mineral-vitamin-medicated supplement _____ ½

Upon this ration, cattle at this weight still maintain good appetite, good digestion, and about a six-to-one feed conversion ratio; therefore, eating about 18½ pounds of feed per day, they will gain over 3 pounds per day. Specifically, about 3 to 3½ pounds per day. I have found certain breeds, crosses, classes, ages, conditions and grades of cattle may respond with a slight variability in rate of gain per day.

As stated before, the amount of corn fed is the amount of corn that the cattle will consume in a day's time. As the cattle get heavier, the total weight-gain is faster, but the proportionate gains are slower.

Cattle, when they are first put into the feed lot, are changed from a mixture of cottonseed, silage and corn to a mixture of corn and cottonseed. This conversion is made as soon as possible. Although in the example I have used, the silage would be eliminated in 40 days (0.2 lb. less silage fed each day). If the cattle maintain good appetites and digestion, the elimination of silage from the ration could be accomplished more rapidly; thereby feeding a ration consisting substantially of cottonseed, shelled corn and supplements. The silage is included because the rumen of the young calf (after weaning) seems to function better when placed in the feed lot if the corn silage is included, reducing it later, than if the animal is abruptly changed to a rich diet of grain and cottonseed.

The cottonseed, shelled corn and the selected supplements mix well together, they do not tend to separate out while in storage, during transportation, during the feeding of the cattle, and the cattle are not selective of the individual ingredients. I.e., they do not pick out the corn, leaving the cottonseed, or pick out the cottonseed, leaving the corn, but uniformly eat the ration as fed.

The above examples give the preferred form of this invention. I.e., the preferred form is to feed the cattle, after the initial introductory period when a certain amount of corn silage is fed, only the cottonseed, corn and mineral supplement. However, it is possible to include urea or other forms of protein supplement into the diet successfully. Urea itself is not a protein, but it has a well recognized equivalent, the ruminant converting the nitrogen of urea into protein. In this regard, experimentation shows feeding cattle only urea and shelled corn is not as desirable as cottonseed and shelled corn. The animals have a duller coat and a noticible tendency to eat dirt and have less appetite than with the preferred cottonseed diet. However, when fed the preferred diets, the animals have good digestion as evidenced by good manure stacking and, also, the animals have good health as evidenced at least in part by good glossy hair coat and better appetite.

However, it appears that up to one-half of the animals' need for digestible protein can be supplied by urea or other protein supplements without complete loss of the synergistic effect of the cottonseed and corn. In this regard, it will be noted that this diet is extremely low in fiber, shelled corn having very little fiber, and the cottonseed containing only a small amount of fiber in the hulls and in the lint contained in the fuzz of undelinted cottonseed.

Standard sources such as Morrison indicate that baby beef weighing about 600 pounds need 1.26 to 1.37 pounds of digestible protein per day in fattening rations. Yearling beef, weighing about 600 pounds, need about 1.18 to 1.32 pounds of digestible protein per day in fattening rations, while older beef, weighing about 1000 pounds, need about 1.71 to 1.91 pounds of digestible protein per day in fattening rations. I have found that this digestible protein can be supplied from other sources such as urea and that supplying no more than one-half of the digestible protein from other sources, such as urea, and at least one-half of the digestible protein from cottonseed is workable. The synergistic effects of rapid gain, good health, and economical feeding, are still at least partially maintained. This maximum amount of protein supplied from other sources, such as urea, can be expressed as no more than .4 lb. of digestible protein equivalent per head per day.

Another way of expressing this is that no more than .05 lb. of digestible protein per 100 pounds body weight is supplied from urea and that at least as much digestible protein is supplied from the cottonseed as from sources other than the corn.

A ration for a 600 pound animal is:

| | Lbs. digestible protein |
|---|---|
| 1.5 lbs. cottonseed at 17.1% | .25 |
| 15.5 lbs. corn at 6.5% | 1.01 |
| Total corn and cottonseed | 1.26 |
| .1 lb. urea at 260% | .26 |
| .5 lb. M-V-M supplement | 0 |
| Total digestible protein | 1.52 |

If less than ¼ lb. per 100 pounds of body weight or less than 1 lb. per head of cottonseed is fed, there is no observable synergistic effect of the better appetite and better conversion ratios and better gains; that is, better utilization of the corn. If more than 1 lb. per 100 pounds of body weight or more than 6 lbs. per head of cottonseed is fed, the cattle tend to have upset digestion, go off their feed and have scours.

The embodiments shown and described above are only exemplary. I do not claim to have invented all the parts, elements or steps described. Various modifications can be made in the proportions, material, arrangement, and operation, and still be within the scope of my invention. The limits of the invention and the bounds of the patent protection are measured by and defined in the following claims. The restrictive description of the specific examples above do not point out what an infringement of this patent would be, but are to enable the reader to make and use the invention.

I claim as my invention:

1. A daily fattening ration for beef cattle weighing over 200 pounds and under 1200 pounds comprising:
   (a) raw, whole fuzzy cottonseed
      (i) in an amount of
         (1) at least ¼ lb. per 100 pounds of body weight and
         (2) at least 1 lb. per head and
      (ii) in an amount of
         (1) no more than 1 lb. per 100 pounds weight and
         (2) no more than 6 lbs. per head;
   (b) raw, whole, shelled corn mixed with the cottonseed in an amount of as much as the cattle will eat, and (c) standard mineral-vitamin-medicated supplements in an amount of standard practice.

2. The invention as defined in claim 1 with additional limitations of another source of digestible protein or equivalent in an amount having
   (1) no more than .4 pound of digestible protein or equivalent per head and
   (2) no more than the digestible protein found in the amount of cottonseed fed.

3. The invention as defined in claim 2 wherein the ration consists substantially of the ration defined therein.

4. The invention as defined in claim 1 with an additional limitation of corn silage being included in the ration.

5. The invention as defined in claim 4 with an additional limitation of another source of digestible protein or equivalent in an amount having
   (1) no more than .4 pound of digestible protein or equivalent per head and
   (2) no more than the digestible protein found in the amount of cottonseed fed.

6. The invention as defined in claim 1 wherein the ration consists substantially of the ration defined therein.

7. The method of feeding beef cattle weighing over 200 pounds and under 1200 pounds comprising: feeding the cattle each day a ration which is a mixture of
   (a) raw, whole, fuzzy cottonseed
      (i) in an amount of
         (1) at least ¼ lb. per 100 pounds of body weight and
         (2) at least 1 lb. per head and
      (ii) in an amount of
         (1) no more than 1 lb. per 100 pounds of body weight and
         (2) no more than 6 lbs. per head;
   (b) raw, whole, shelled corn in an amount of as much as the cattle will eat, and
   (c) standard mineral-vitamin-medicated supplements in an amount of standard practice.

8. The invention as defined in claim 7 wherein said ration is the only feed supplied the cattle.

9. The invention as defined in claim 7 with the limitations of adding about four times as much corn silage as shelled corn to the ration when the calves are first placed in the feed lot and gradually diminishing the amount of silage in the ration so that at the end of about 40 days, the silage is eliminated and the ration consists substantially of the cottonseed, shelled corn and supplement.

10. The invention as defined in claim 7 with additional limitations of feeding the cattle another source of digestible protein in an amount having no more digestible protein than the digestible protein found in the amount of the cottonseed fed.

11. The invention as defined in claim 10 wherein said ration is the only feed supplied the cattle.

12. The invention as defined in claim 10 with the limitations of adding about four times as much corn silage as shelled corn to the ration when the weaned calves are first placed in the feed lot and gradually diminishing the amount of silage in the ration so that at the end of about 40 days, the silage is eliminated and the ration consists substantially of the cottonseed, shelled corn and supplement.

References Cited

UNITED STATES PATENTS

| | | | |
|---|---|---|---|
| 987,062 | 3/1911 | Glazier | 99—2 |
| 2,934,431 | 4/1960 | Cavanagh | 99—2 |
| 2,965,488 | 12/1960 | Belasco | 99—2 |
| 3,084,046 | 4/1963 | Johnson et al. | 99—2 |
| 3,249,441 | 5/1966 | Reynolds et al. | 99—2 |

OTHER REFERENCES

Morrison: Feeds and Feeding, 21st Ed., 1948, pp. 473–476 (par. 658–661), pp. 548–551, 556–558 and pp. 1174–1175.

Ed.-Nitrogen Division, Allied Chemical & Dye Corp., Feed Urea in Ruminant Nutrition, Abstract No. 246 (1949).

Nitrogen Div., Allied Chem. & Dye Corp., Feed Urea in Ruminant Nutrition, Abstract No. 348 (1953).

NORMAN YUDKOFF, Primary Examiner

K. P. VAN WYCK, Assistant Examiner